H. J. BACHTEL.
Sausage-Stuffer.
No. 204,521. Patented June 4, 1878.
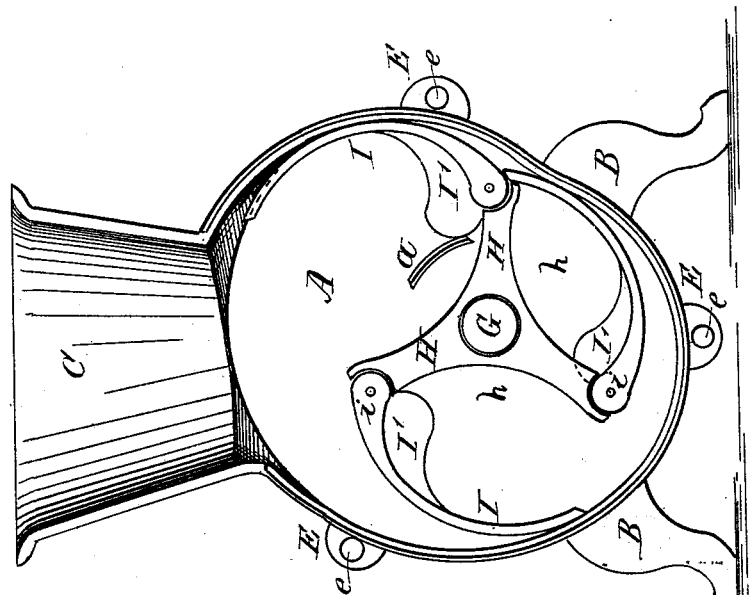
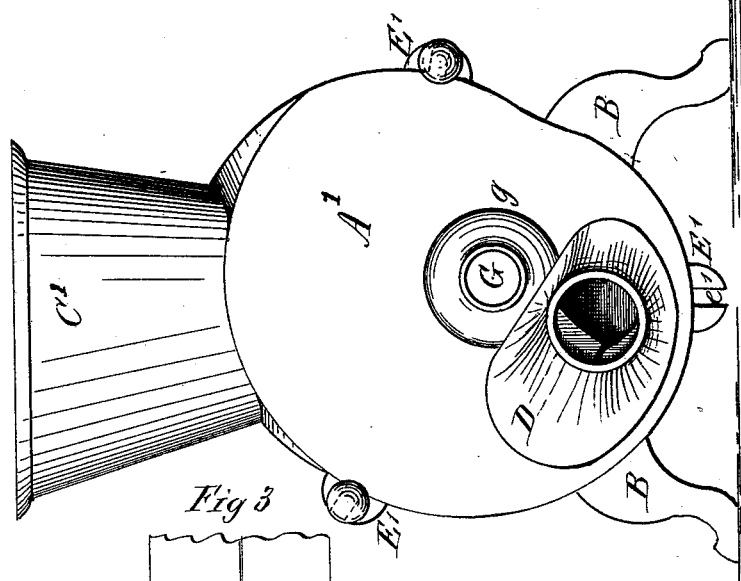
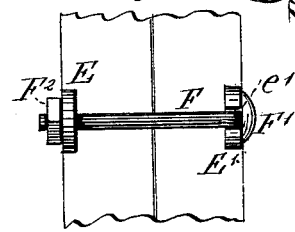

UNITED STATES PATENT OFFICE.

HIRAM J. BACHTEL, OF McDONALDSVILLE, OHIO.

IMPROVEMENT IN SAUSAGE-STUFFERS.

Specification forming part of Letters Patent No. 204,521, dated June 4, 1878; application filed August 4, 1877.

*To all whom it may concern:*

Be it known that I, HIRAM J. BACHTEL, of McDonaldsville, in the county of Stark and State of Ohio, have invented certain new and useful Improvements in Sausage-Stuffers; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of this improvement in sausage-stuffers consists in making a heart-shaped casing vertically divided into two sections to permit a ready access to the interior of the case for cleansing the same, or for other purposes, the said sections being bolted together when the machine is in operation.

The invention relates, also, to an improved mechanism for forcing the cut meat from the casing into the skins, said mechanism consisting of a series of scrapers hinged to a crank-shaft, the axis of whose rotation is eccentric to the casing.

Figure 1 is an elevation of the interior of one half of the casing and of the hinged scrapers. Fig. 2 is an elevation of the exterior of the other half of the casing; and Fig. 3 is a view of the devices for bolting the sections of the casing together.

In the drawings, A A' represent the casing, which is substantially heart-shaped in side elevation, and is divided vertically into two halves or sections, as shown. It is supported upon suitable legs B B, which are so disposed as to bring the longer diameter of the casing into a nearly vertical position when it (the casing) stands upon said legs.

At or near the upper or opposite end of its longer diameter the casing is provided with a mouth or funnel, C C', through which the cut meat is fed. D is the nozzle or exit, through which the meat is forced from the casing into the skins. E E are lugs or ears attached to the perimeter of one section of the casing, each having a central perforation, $e$. E' E' are lugs or ears, each having a central slot, $e'$, and are attached to the other section of the casing at points corresponding to those of lugs E E. F is a bolt screw-threaded at one end, and having a head, $F^1$, at the other.

When it is desired to fasten the parts of the casing together, the heads $F^1$ of bolts F are placed in slots $e'$, the screw-threaded ends passing through the lugs E, in which position the bolts are secured by nuts $F^2$.

This construction enables me to readily take the casing apart for cleansing or for other purposes without necessitating the removal of the nuts $F^2$ from the bolts, as the slots $e'$ allow a ready disengaging of the ends $F^1$ from lugs E', thus freeing the parts of the casing from each other.

G is a shaft mounted in bearings $g$, the axis of its rotation being eccentric to the casing A A'. H H are three or more radial arms attached to and rotating with the shaft G. I I are curved scrapers hinged at $i\ i$ to arms H H. These scrapers are of equal length and of a width equal to the distance between the interior faces of the lateral walls of the casing. They are constructed upon arcs of the same circle substantially, and are hinged at equal distances from the shaft G. Hence it will be seen that when closed they will describe a cylinder, which can rotate within the casing, but eccentric thereto.

The arms H H are so shaped and attached to the shaft G as to form with each other and with the scrapers I I substantially elliptical spaces, as shown at $h\ h$, which spaces, while the machine is in use, will be filled with meat, furnishing a yielding or cushion-like surface and core for the scrapers to press against as they force out their respective charges; and it is evident that the scrapers will be thus enabled to entirely empty each new load more easily and effectively than if the meat was pressed against a metallic or other hard cylinder having a diameter equal, or nearly equal, to that of the scrapers.

To the inner face of wall A is attached a curved rib, $a$.

I' I' are cam-shoulders, with one of which each scraper is provided on that edge which moves along the wall A.

When the shaft G is rotated, the scrapers will, in turn, be thrown back upon their hinges by the contact of the cams I' with the rib $a$, so that they will be opened to their widest extent when they pass the mouth C, at which point they are charged with meat. After passing this mouth C they are gradually closed toward the shaft, forcing the meat through the nozzle or exit D into the skins.

From an examination of the drawings, it will be seen that as the casing is divided vertically into two parts, which can be completely and instantly separated from each other, the operation of cleansing the stuffer is much easier than if said casing were divided horizontally.

Having thus described my invention, what I claim as new, and desire to secure by Letters Patent, is—

1. In combination with the outer casing, the scrapers I, mounted, as described, and the stationary projection a, for opening said scrapers, substantially as set forth.

2. In combination with the arms H H, the hinged scrapers I I, arranged, as described, to form open spaces h h between the arms and the said scrapers, substantially as set forth.

In testimony that I claim the foregoing as my own I affix my signature in presence of two witnesses.

HIRAM J. BACHTEL.

Witnesses:
P. S. TOWERS,
L. M. DAVIS.